US012655047B2

(12) United States Patent
Johann et al.

(10) Patent No.: US 12,655,047 B2
(45) Date of Patent: Jun. 16, 2026

(54) PLUMBING SYSTEM AND METHOD FOR PURIFYING DRINKING WATER

(71) Applicant: BWT Holding GmbH, Mondsee (AT)

(72) Inventors: Jürgen Johann, Mondsee (AT); Katharina Weitgasser, Wals (AT)

(73) Assignee: BWT Holding GmbH, Mondsee (AT)

( * ) Notice: Subject to any disclaimer, the term of this patent is extended or adjusted under 35 U.S.C. 154(b) by 366 days.

(21) Appl. No.: 18/035,795

(22) PCT Filed: Nov. 4, 2021

(86) PCT No.: PCT/EP2021/080616
§ 371 (c)(1),
(2) Date: May 8, 2023

(87) PCT Pub. No.: WO2022/101082
PCT Pub. Date: May 19, 2022

(65) Prior Publication Data
US 2023/0406739 A1 Dec. 21, 2023

(30) Foreign Application Priority Data

Nov. 12, 2020 (DE) ..................... 10 2020 129 850.1

(51) Int. Cl.
*C02F 1/72* (2023.01)
*C02F 1/50* (2023.01)
(Continued)

(52) U.S. Cl.
CPC .............. *C02F 1/722* (2013.01); *C02F 1/505* (2013.01); *C02F 1/66* (2013.01); *C02F 1/688* (2013.01); *C02F 1/76* (2013.01); *C02F 1/78* (2013.01); *E03C 1/046* (2013.01); *E03C 1/10*

(2013.01); *C02F 2201/006* (2013.01); *C02F 2303/04* (2013.01); *C02F 2305/023* (2013.01);
(Continued)

(58) Field of Classification Search
None
See application file for complete search history.

(56) References Cited

U.S. PATENT DOCUMENTS 6,058,718 A * 5/2000 Forsberg ................... E03B 3/28
62/150
2005/0239679 A1 10/2005 Doetsch et al.
(Continued)

FOREIGN PATENT DOCUMENTS

CN 108867795 A 11/2018
DE 19851345 A1 5/2000
(Continued)

*Primary Examiner* — Peter Keyworth
(74) *Attorney, Agent, or Firm* — Smartpat PLC

(57) ABSTRACT

In order to make available water that is as germ-free as possible, the invention provides a water installation system (1) comprising an extraction point (38) and/or an outlet, wherein the water installation system has a direction of flow (D) towards the extraction point and/or towards the outlet, and comprises at least one chemical germ barrier (200) upstream of the extraction point and/or the outlet when viewed in the direction of flow, wherein the chemical germ barrier is selected in particular from the group consisting of at least one alkalinizing and/or oxidative material, silver, chlorine, and combinations thereof.

5 Claims, 10 Drawing Sheets

(51) Int. Cl.

| | |
|---|---|
| *C02F 1/66* | (2023.01) |
| *C02F 1/68* | (2023.01) |
| *C02F 1/76* | (2023.01) |
| *C02F 1/78* | (2023.01) |
| *E03C 1/046* | (2006.01) |
| *E03C 1/10* | (2006.01) |

(52) U.S. Cl.

CPC ...... *C02F 2307/10* (2013.01); *C02F 2307/14* (2013.01); *E03C 2201/40* (2013.01)

(56) References Cited

U.S. PATENT DOCUMENTS

| | | | |
|---|---|---|---|
| 2007/0074975 A1* | 4/2007 | Buschmann ......... C02F 1/4672 205/466 |
| 2008/0105618 A1 | 5/2008 | Beckius et al. |

| | | | |
|---|---|---|---|
| 2012/0124730 A1 | 5/2012 | Morotomi et al. |
| 2012/0255623 A1 | 10/2012 | Bell et al. |
| 2015/0298995 A1 | 10/2015 | Johann et al. |
| 2015/0321188 A1 | 11/2015 | Johann et al. |
| 2021/0053841 A1* | 2/2021 | Hofmann ............... G01N 31/22 |

FOREIGN PATENT DOCUMENTS

| | | |
|---|---|---|
| DE | 10248652 A1 | 4/2004 |
| DE | 102012105723 A1 | 1/2014 |
| DE | 202014003627 U1 | 6/2014 |
| DE | 102015011752 A1 | 3/2017 |
| JP | S63305983 A | 12/1988 |
| KR | 20150082977 A | 7/2015 |
| RU | 2663172 C2 | 8/2018 |
| WO | 2009046563 A2 | 4/2009 |
| WO | 2014001506 A1 | 1/2014 |
| WO | 2017093385 A1 | 6/2017 |

* cited by examiner

PLUMBING SYSTEM AND METHOD FOR PURIFYING DRINKING WATER

CROSS-REFERENCE TO RELATED APPLICATION

This application is a national stage application, filed under 35 U.S.C. § 371, of International Patent Application No. PCT/EP2021/080616, filed on 4 Nov. 2021, which claims the benefit of German Patent Application No. 10 2020 129 850.1, filed 12 Nov. 2021.

TECHNICAL FIELD

The disclosure relates to a water installation system, more particularly to a drinking water system, and to a method for treating drinking water. Moreover, the disclosure also relates to a germ barrier, a domestic water filter, a shower toilet, a water dispenser, and to a filter cartridge.

BACKGROUND

Drinking water can be provided from different sources, such as from a tank or from a water pipe, depending on the application situation.

During phases of stagnation, there is in particular a risk that germs or microorganisms such as bacteria, fungi, or algae will proliferate in the water inside pipes. A stagnation phase is a period during which no water is extracted. Below, the term "microorganisms" refers to both algae and organisms such as bacteria and fungi which might induce processes that are harmful to health.

Drinking water systems must be designed such that, compared to the drinking water provided, the quality of the water within the system does not deteriorate over time due to the ingress of microorganisms. On the one hand, microorganisms might be introduced into drinking water through non-potable water. To avoid this, safety fittings such as system separators or a so-called "free outlet" can be installed at endangered tapping or extraction points. System separators consist of chambers connected in series and having a respective backflow preventer or non-return valve connected therebetween. In the case of a free outlet, the supplied water is discharged at a distance from the highest possible non-potable water level, such as in a conventional sink. This provides a free flow path which prevents water that has flowed out of the water pipe from being sucked back, even if negative pressure builds up in the pipe system.

However, microorganisms can also proliferate, i.e., multiply, during the stagnation phase in the drinking water that is still to be extracted. This can progress to the point of biofilm formation. Therefore, in addition to the risk of introducing microorganisms from non-potable water, there is also the risk of so-called reverse or backward germ contamination.

For the purpose of softening or desalination and possibly further treatment such as targeted mineralization, drinking water is in some cases fed through treatment equipment installed between the domestic water supply connection and the tapping or extraction point, such treatment equipment including filter cartridges with ion exchangers, remineralization devices or reverse osmosis systems, for example. The pipes connecting such equipment, the water source, and the extraction point are likewise subjected to the risk of backward contamination with germs.

In order to counteract the proliferation of microorganisms, it has been known from practice to heat the water in, for example, a reservoir or container of water dispensers, so as to kill the microorganisms. This may, for example, be accomplished periodically by heating the entire water container. This procedure is complex and energy-intensive. Moreover, microorganisms might also accumulate in particular in the vicinity of the outlet of a water dispenser and obviously cannot be reached by the heated water there, but will be flushed out when the water dispenser is actuated.

In order to remove microorganisms from drinking water, devices and methods for ultrafiltration or microfiltration are known. Bacteria, for example, are generally not able to pass through an ultrafilter. Microfiltration refers to a process for filtration through membranes that have a pore size between 0.1 µm and 1 µm, which means that the majority of bacteria cannot pass through a microfiltration membrane either. In ultrafiltration, by contrast, the pore size is less than 0.1 µm. In particular capillary membranes are known as a filter medium for ultrafiltration or microfiltration, in which case the membrane is defined by the wall of the capillary.

During ultrafiltration or microfiltration, increased bacterial growth or the formation of biofilms may occur on the concentrate side. In this case, microorganisms will accumulate on the membrane during filtration and will become embedded in a matrix of extracellular polymeric substances (EPS). EPS are formed by microorganisms and released into their environment. The composition of the EPS depends on the species involved in the biofilm. The EPS ensure that the microorganisms adhere to the membrane surface and provide for the mechanical and chemical stability of the biofilm. With increasing thickness of the biofilm, the filtration performance of the membrane will decrease. Furthermore, the increased bacterial growth on the concentrate side can lead to uncontrolled reverse or backward germ contamination into the pipe network.

SUMMARY

The disclosure is based on the object of providing water that is as germ-free as possible, in particular drinking water. More particularly, it is an object of the disclosure to increase the service life and safety of a water installation system, and at the same time to protect the pipe system from bacterial backward contamination.

The disclosure seeks to provide a device and a method which ensure that drinking water can be extracted without any contamination by microorganisms, even after a preceding stagnation phase in terms of extraction.

The object of the disclosure is already achieved by a water installation system, a germ barrier, and by a method for filtering drinking water according to any one of the independent claims.

Preferred embodiments and refinements of the invention will be apparent from the subject-matter of the dependent claims, the description, and the drawings.

The disclosure provides a water installation system, in particular a drinking water system, which comprises an extraction point and/or an outlet, the drinking water system having a direction of flow towards the extraction point and/or the outlet and comprises at least one chemical germ barrier upstream of the extraction point and/or the outlet when viewed in the direction of flow.

Thus, on the one hand, the germ barrier can be placed upstream of the extraction or tapping point, also referred to as the "point of use".

On the one hand, a germ barrier allows to prevent backward contamination with germs into the installation system, against the direction of flow.

On the other hand, it permits to avoid contamination propagating along the wall of a pipe, in particular the formation of a biofilm, towards a downstream component, in particular a filter.

When installed between an outlet and a water-carrying pipe, backward contamination with germs from the waste water system into the water installation can be avoided. This allows in particular to dispense with a free outlet in many application cases.

Below, for the sake of simplicity, the water installation system will be referred to as a "drinking water system".

The drinking water system is fed from a drinking water source. The drinking water system is delimited towards the drinking water source by an inlet from which drinking water enters the drinking water system, and by the extraction point which has the chemical germ barrier arranged upstream thereof. The drinking water system preferably constitutes an separately manageable component which can be connected to the water supply, for example in a household. The drinking water system may consist of a plurality of components.

The term "chemical germ barrier" is used in contrast to a "mechanical germ barrier". A mechanical germ barrier is a particle barrier such as a filter, which retains germs by virtue of the respective size ratios. A chemical germ barrier, by contrast, comprises in particular at least one substance that has a killing effect on microorganisms, i.e. constitutes a biocidal contact material. "Biocidal contact material" is understood to mean materials which have a bactericidal and/or fungicidal effect and/or an algicidal effect when coming into contact with water.

The chemical germ barrier kills microorganisms in a section of an inlet and/or outlet pipe of the water installation system, at least during a phase of stagnation.

The chemical germ barrier which is placed upstream of the extraction point ensures in a simple and reliable manner that the growth of germs in the water to be extracted is reduced compared to drinking water systems without a chemical germ barrier, and that any germs that might have entered are killed in the stagnation phase as well. Therefore, advantageously, the water extracted from the drinking water system following a stagnation phase will also be low in germs.

The germ barrier is in particular configured such that, during a stagnation phase in the flow path, the water in a section of the flow path is chemically treated in such a way that microorganisms are killed within this section. The germ barrier in particular prevents the growth of microorganisms along a wall against the direction of flow.

In one embodiment, the germ barrier is only effective during a stagnation phase.

The chemical germ barrier is selected from the group which comprises at least one material that has an alkaliniz- ing and/or oxidative effect. This can in particular be a carbonate material, oxide material, peroxide material, silver, chlorine, ozone, and combinations thereof. Thus, several chemical germ barriers are eligible for the drinking water system, depending on the application case and external conditions.

In particular peroxide granules are suitable for a germ barrier, as will be explained in detail below.

The alkalinizing and/or oxidative material allows to achieve an increase in the pH to more than 9, for example, in particular to a pH of more than 10 but preferably less than 13, to achieve a biocidal effect.

Furthermore, the material may have an oxidizing effect, in particular it may form an oxidizing substance such as hydrogen peroxide, for example.

According to an advantageous refinement, the chemical germ barrier comprises an alkalinizing and/or oxidative material which comprises at least one material selected from the group consisting of carbonates, oxides, and peroxides.

Particularly suitable for use are calcium carbonate, magnesium carbonate, calcium oxide, magnesium oxide, sodium peroxide, potassium peroxide, magnesium peroxide, calcium peroxide, and zinc peroxide, and mixtures of at least two of the materials mentioned.

Especially agglomerated materials which largely prevent the formation of dust are easy to handle. More particularly, the alkalinizing and/or oxidative material may be provided at least partly in the form of granules. Preferred alkalinizing and/or oxidative material comprises particles having a particle size of less than 5 mm, preferably less than 3 mm, most preferably in the range between 0.2 mm and 10 mm, preferably between 0.5 mm and 2.5 mm.

The particle sizes given above relate to the initial state of the respective alkalinizing and/or oxidative material. An upper limit for the particle size is in particular determined by the desired dissolution kinetics. In principle, the use of powder is also possible. Preferred are alkalinizing and/or oxidative materials comprising particles that are larger than 20 micrometers, more preferably larger than 200 micrometers, so that the flow resistance of the material will be reduced compared to a bed consisting of smaller particles.

These granulated alkalinizing and/or oxidative materials dissolve sufficiently slowly in water, such that the pH of the water treated with the chemical germ barrier according to the invention will increase only during a stagnation phase in order to establish the desired biocidal effect. Thus, compared to devices without a germ barrier according to the invention, the invention permits to reduce or almost completely prevent a formation of biofilms and the growth of algae in the water treatment device as well as the discharge of microorganisms into the water that is extracted directly following the stagnation phase.

Influence of the pH on bacterial growth:

All microorganisms have a pH range within which growth is possible, i.e. an optimum pH range. Most natural environments have a pH between 4 and 9, and the pH optimum of many microorganisms is exactly within this range. The bacteria most commonly found in drinking water, such as Legionella, Pseudomonas, E. coli and enterococci, have their pH optimum in exactly this range.

| Bacterium | pH optimum | pH range allowing for growth |
|---|---|---|
| E. coli | 7-7.5 | 5.5-9 |
| Enterococci | 7.5 | 4.6-9.9 |
| Legionella | 7 | 5-8.1 |
| Pseudomonas ae. | 7.0-7.5 | 4.5-9.5 |

While the extracellular pH value has an impact on the growth of the bacteria, the intracellular pH must remain close to neutrality (with the exception of extremely acidophilic or alkaliphilic bacteria), since DNA is an acid-labile structure and RNA is an alkali-labile structure. If the extracellular pH is outside the pH optimum or outside the range in which growth is still possible (see table), the bacteria will no longer be able to stabilize the intracellular pH value. This will slow down or stop bacterial growth or lead to the death of the bacteria.

As soon as water is extracted through the drinking water system, the hydrogen peroxide as formed during the preceding stagnation phase, for example, will be flushed out and will therefore be present in an extremely low concentration in relation to the total amount of extracted water.

The water stagnant during the stagnation phase will be mixed with fresh water when being extracted, and the pH of the extracted water, which increased due to the alkalinizing material, will thereby be reduced.

The alkalinizing and/or oxidative material is in particular configured such that after a stagnation phase of 5 hours, the OH concentration increases to an extent such that the pH increases to between 10 and 13.

Furthermore, an amorphous silicate material can be admixed into the alkalinizing and/or oxidative material. The silicic acid dissolved in water will stabilize the pH value on the filtrate side.

Particularly suitable for being used are calcium carbonate, magnesium carbonate, calcium oxide, magnesium oxide, sodium peroxide, potassium peroxide, magnesium peroxide, calcium peroxide, and zinc peroxide, which are produced in the form of agglomerates by pressing or caking respective powders, optionally with the addition of auxiliaries, to form a shaped body, and by subsequently breaking the shaped body.

Such materials are disclosed in DE 102 48 652 A1, for example. In comparison to the corresponding non-agglomerated peroxides, these materials exhibit less tendency to cake or dust and are therefore easy to dose.

Thus, in a surprisingly simple manner, the disclosure provides a chemical germ barrier which has a biocidal effect that is based on an increase in the pH value and/or the release of oxygen when the peroxide material comes into contact with water. The corresponding decomposition occurs via oxygen radicals. Thus, hydrogen peroxide will be present in the water, which is generally cytotoxic and has a disinfecting effect on many prokaryotic microorganisms. Hydrogen peroxide is particularly suitable for combating algae in drinking water.

The increasing of the pH and optionally the release of hydrogen peroxide in particular prevents a biofilm from growing into the membrane filter.

In a preferred embodiment, the alkalinizing and/or oxidative material is placed directly upstream of the membrane stack. The expression "placed directly upstream of the membrane stack" means that there are no other major components, in particular no pipe sections, located between the alkalinizing and/or oxidative material and the membrane stack. This is meant with the exception of a retention grid or a water-permeable fleece, which may be arranged between the membrane stack and the alkalinizing and/or oxidative material.

Due to the alkalinizing and/or oxidative material placed upstream of the membrane stack for microfiltration or ultrafiltration, the invention is able to provide drinking water with a low germ content. At the same time with the filtration of the drinking water, the growth of biofilms into the filter is counteracted. Moreover, drinking water can be reliably extracted without being contaminated by microorganisms, especially after a preceding stagnation of extraction.

In one embodiment, the chemical germ barrier can be provided with a housing having an internal volume in the range from 10 ml to 200 ml, preferably an internal volume in the range between 15 ml and 50 ml, and can thus be extremely compact.

More particularly, the chemical germ barrier comes in the form of an attachment and is designed such that after a stagnation phase of 5 hours the OH concentration increases so that the pH value increases to between 10 and 13, and/or so that the concentration of hydrogen peroxide within the peroxide attachment amounts to less than 50 mg/l but more than 1 mg/l.

The disclosure furthermore provides, as a drinking water system that comprises a container as the water source, a gravity-driven domestic water filter which comprises a chemical germ barrier as described above and an ultrafilter or microfilter as a water treatment device, with the chemical germ barrier in particular arranged below, i.e. downstream of an ion exchanger. Such a gravity-driven domestic water filter typically includes a filter medium comprising an ion exchange material. More particularly, it uses an ion exchange resin. Such gravity-driven domestic water filters are usually primarily used for softening the water. However, depending on the design, it may also allow to remove pollutants at the same time, especially heavy metals. By additionally providing a filter, e.g. for microfiltration, with an attachment in the form of a chemical germ barrier, it is possible to remove bacteria almost completely and very easily from the water to be treated.

Preferably, the drinking water system is designed so as to be detachable from a further component of the domestic water filter, in particular from a filter cartridge containing an ion exchange resin. In particular when the ion exchange material is replaced, the water treatment device in the form of a microfilter, which generally has a longer service life, can thus be detached and reused.

The disclosure also provides a water dispenser comprising a drinking water system as described above, with the drinking water system in particular defining the outlet of the water dispenser.

The water dispenser usually comprises a water container, or reservoir, and an actuating means for dispensing drinking water. Furthermore, the water dispenser may include a device for cooling and/or heating the water to be dispensed. Usually, the water dispenser has a stand and can thus be placed, especially in commercial areas, so that customers can withdraw water. The invention allows to prevent the release of germs that may arise in the reservoir or in adjacent lines.

The drinking water system in particular comes in the form of an outlet, so that, during operation, the water from the drinking water system flows directly into the user's container. By using the drinking water system as the last component in the path of the water it is ensured that no germs are released into the user's container.

In a further embodiment, the outlet is surrounded by a contact protection. More particularly, a wall is provided extending from above at least down to the level of the outlet, so that the outlet is protected against inadvertent touching. This prevents germs from arising on the only surface existent on the permeate side.

Furthermore, the germ barrier may be arranged upstream of a dead branch in the water installation system, in particular upstream of a compensation tank.

Installation systems often include branches that are not or only rarely used. Microorganisms can grow in these so-called dead water zones and can then get into the drinking water.

This applies in particular to the branch to a non-flushable pressure compensation tank which is connected to the pipe system only via a T-piece.

A germ barrier at the entrance of the T-piece can prevent microorganisms from ingressing into the drinking water.

The disclosure also relates to an installation system comprising a shower toilet.

The shower toilet comprises a nozzle through which a jet of water can be emitted towards the user's buttocks. Preferably, the shower toilet includes a heater to emit a warm jet of water.

The nozzle is preferably configured so as to be extendable in order to get right under the buttocks of the user.

According to a preferred embodiment, the nozzle is controlled via a control panel which is arranged in particular next to a toilet seat.

A germ barrier is arranged between the nozzle and an on-site connection for the shower toilet.

The germ barrier prevents backward contamination with germs in the installation system.

The germ barrier preferably comprises a replaceable cartridge with a filling that prevents microorganisms from growing therethrough.

In one embodiment, a connection for the cartridge is provided on the toilet bowl. The connection may in particular be arranged on a rear side of a lower surface or on the wall side even on top of the toilet bowl.

The disclosure is intended for shower toilets which are equipped with a nozzle as standard. The nozzle is located at the toilet bowl.

However, it is also contemplated that the germ barrier forms part of an attachment for a toilet bowl, which can be retrofitted.

In this variant, the nozzle forms part of the attachment which may comprise, inter alia, the toilet seat, a control panel, and/or a heater for heating the water dispensed via the nozzle.

Besides being integrated into the toilet, the cartridge may also form part of a module that is arranged between an inlet of the toilet and an on-site water output port.

The cartridge may in particular be arranged in a recess of the toilet seat and/or of the toilet bowl.

The cartridge is in particular installed in a concealed manner, so it cannot be directly seen by the user.

It has been found that even cartridges having a very small volume are large enough to effectively function as a germ barrier.

The cartridge may in particular have an internal volume between 10 ml and 1 l, more preferably between 20 and 100 ml, and most preferably between 30 and 40 ml.

The disclosure furthermore relates to a method for cleaning a shower toilet.

A cartridge including an alkalinizing and/or oxidative agent is installed between an on-site connection and the shower toilet.

The cartridge is replaced at regular intervals.

If the cartridge is filled with a peroxide, it will have a long service life. It will usually be sufficient to replace it once a year.

The disclosure moreover provides a filter cartridge for drinking water, which comprises a drinking water system, and this filter cartridge is in particular configured for being used as a filter cartridge for a table water filter, for a machine for preparing hot and/or cold beverages, and/or for an under-sink water filter.

The disclosure furthermore relates to a method for treating water, in particular drinking water, in particular using a water installation system as described above, the water being provided in a water source, in particular a water pipe or a water tank. The method for treating water comprises a stagnation phase during which the water does not emerge from the water source, and a withdrawal or extraction phase during which the water is extracted and optionally replenished from the water source.

During the extraction phase, the drinking water passes through a chemical germ barrier.

The germ barrier is effective at least during the stagnation phase. Depending on how the chemical germ barrier is implemented, it is in particular provided in the flow path of the water at least during the stagnation phase.

More particularly, the germ barrier is formed by a material that has an alkalinizing and/or oxidative effect, which enriches the water within the germ barrier with OH ions and/or with hydrogen peroxide during stagnation.

According to a further embodiment, the germ barrier is selected from the group consisting of at least silver, chlorine, ozone, and combinations thereof.

In addition to providing essentially germ-free drinking water, the method can be performed for producing a hot or cold beverage, for example.

A further embodiment of the method uses, as a chemical germ barrier, an alkalinizing and/or oxidative material which is selected from the group consisting of carbonates, oxides, and peroxides.

In particular, at least one alkalinizing and/or oxidative material is used as a chemical germ barrier, and the drinking water passes through the alkalinizing and/or oxidative material and optionally then passes through a water treatment device. According to a preferred embodiment, the drinking water has a pH in a range from 9 to 13 during the stagnation phase, in particular more than 10 and less than 13, and/or a maximum hydrogen peroxide concentration of 50 mg/l.

BRIEF DESCRIPTION OF THE DRAWINGS

The invention is illustrated in more detail in the attached drawings by way of exemplary embodiments. The same and similar components are denoted by the same reference numerals, while the features of the various exemplary embodiments can be combined with one another.

DETAILED DESCRIPTION

Figure 1:
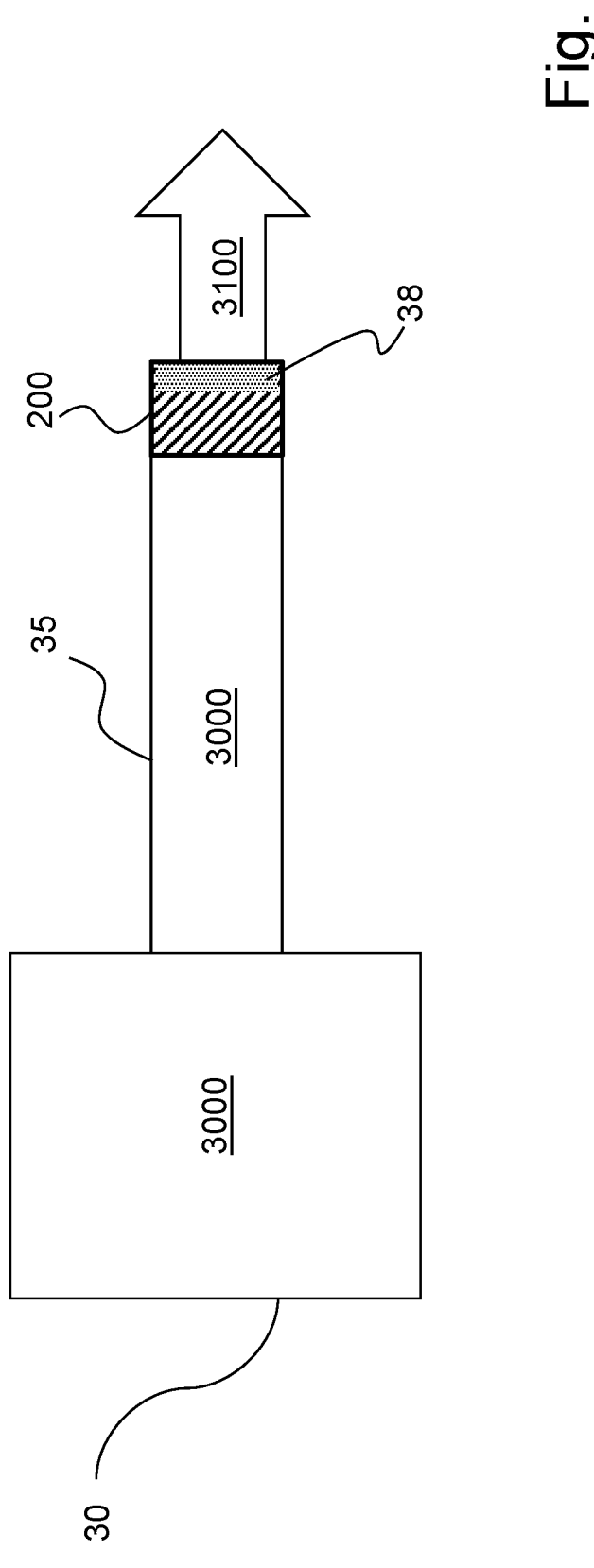
FIG. 1 is a schematic diagram of the provision of drinking water using a drinking water filter.

FIG. 1 illustrates an exemplary embodiment for the provision of drinking water. Water is provided in a water source 30, for example a water tank or via a water pipe in the building. The input water 3000 flows through a pipe 35 to the extraction or tapping point 38. The water extracted at this "point of use" is referred to as "output water" 3100.

If input water 3000 is stagnant in the water source and in the pipe 35 to the extraction point, microorganisms can proliferate therein. The invention addresses this problem by having, in this exemplary embodiment, a chemical germ barrier 200 arranged directly at the "point of use" 38 so that the output water 3100 is directly extracted from the drinking water system 1.

The drinking water system 1 comprises an extraction point 38 and has a direction of flow D towards the extraction point. Upstream of the extraction point 38 when viewed in the direction of flow D, the drinking water system 1 comprises at least one chemical germ barrier 200.

The chemical germ barrier is selected from the group consisting of, for example, an alkalinizing and/or oxidative material, silver, chlorine, ozone, and combinations thereof. Below, a chemical germ barrier comprising alkalinizing and/or oxidative material will often be mentioned as an exemplary embodiment. The design features of the drinking water system and its components essentially apply similarly to embodiments that include the other chemical germ barriers mentioned. This will be obvious for a person skilled in the art from the figures and the associated description.

Figure 2A:
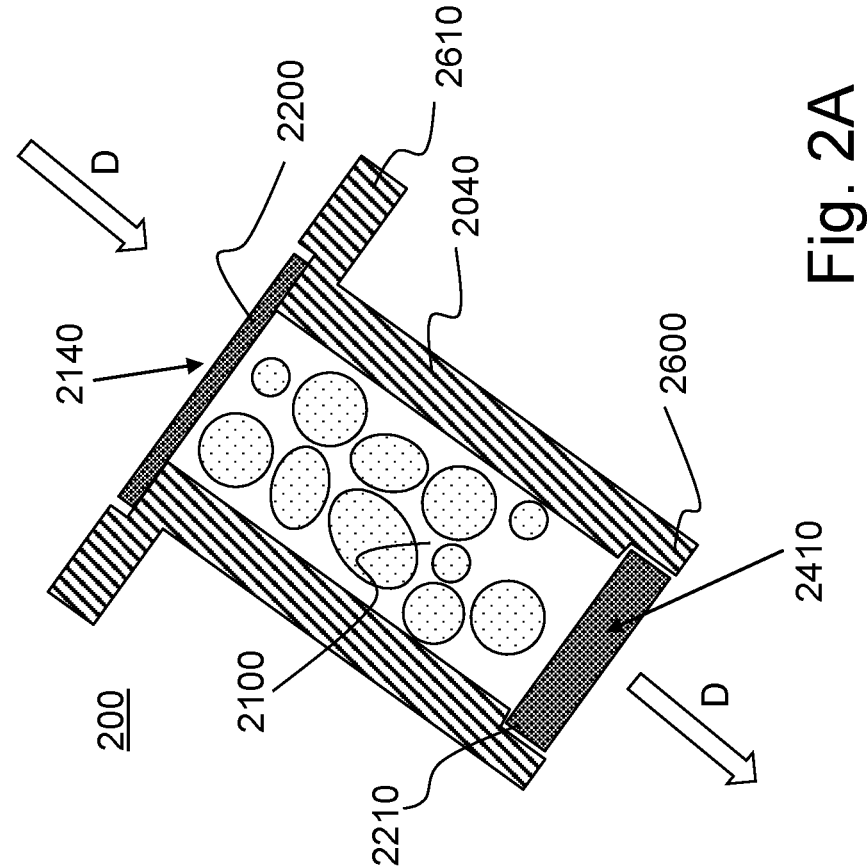
FIG. 2A is a schematic view of a first embodiment of a chemical germ barrier in the form of a peroxide attachment.

FIG. 2A shows a chemical germ barrier 200 comprising a material 2100 that has an alkalinizing and/or oxidative effect. Like the drinking water system 1, the chemical germ barrier 200 generally has a direction of flow D, and the alkalinizing and/or oxidative material 2100 is placed upstream of the extraction point when viewed in the direction of flow D.

Figures 2B, 2C:
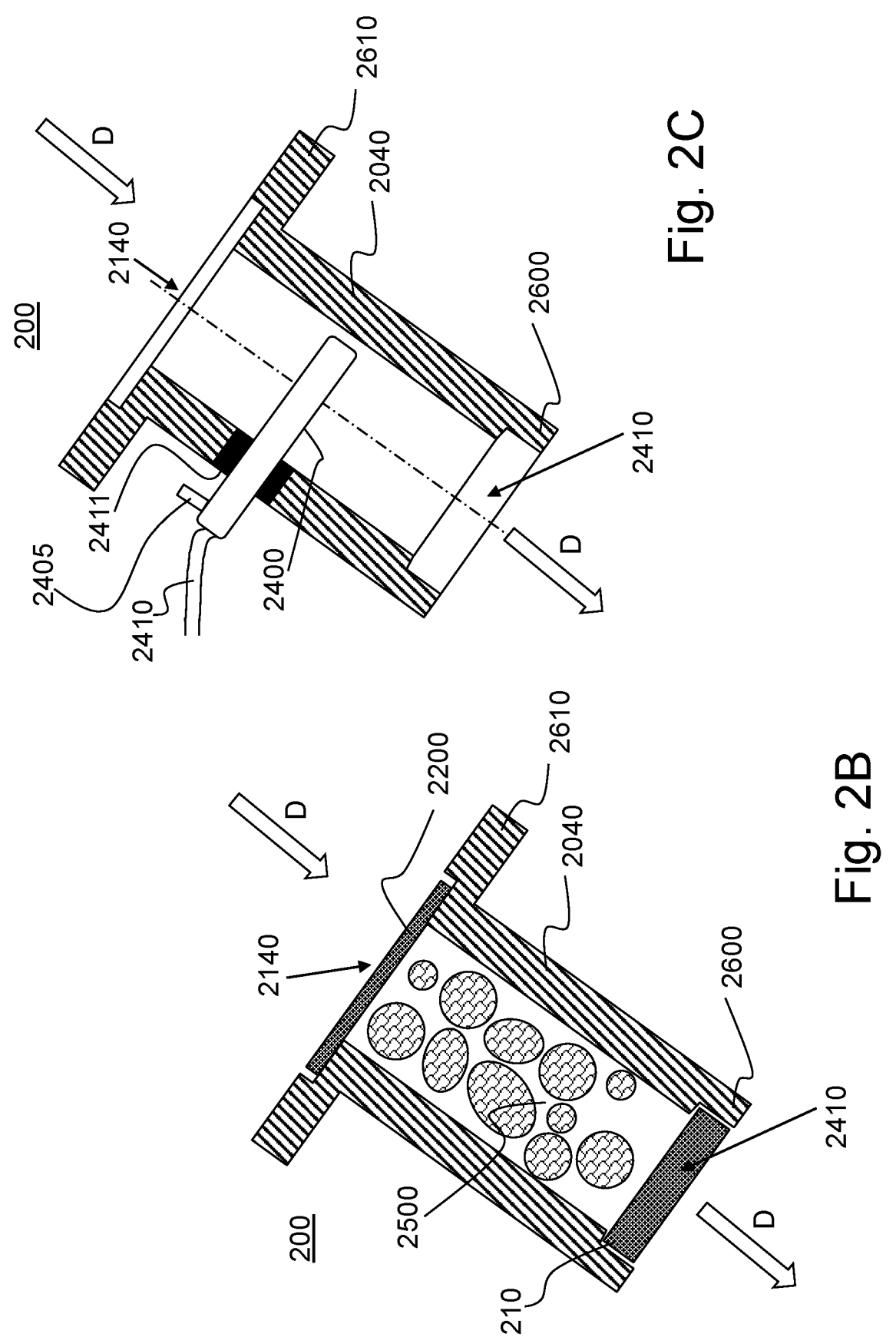
FIG. 2B is a schematic view of a further embodiment of a chemical germ barrier comprising silver.
FIG. 2C is a schematic view of a further embodiment of a chemical germ barrier comprising chlorine.

FIG. 2B shows a chemical barrier 200 comprising a silver-containing material. When water flows through the chemical germ barrier, the silver ions and/or the metallic silver provided by the silver-containing particles will unfold a biocidal effect in the drinking water as it passes through the chemical germ barrier. The silver-containing particles 2500 may be metallic silver components such as a silver coating on the inner surface of the housing 2040, or integrated silver fabrics or silver fleeces, or silver salts in the form of a particle bed inside the sleeve 2040. The latter embodiment is illustrated in FIG. 2B.

FIG. 2C shows a chemical germ barrier 200 comprising a dosing pump 2400 for chlorine. The dosing pump 2400 protrudes into the interior of the sleeve 2040 which defines a housing of the chemical germ barrier 200. The dosing pump 2400 has a power connection 2410. A seal 2411 is arranged between the housing wall 2040 and the dosing pump 2400. The dosing pump 2400 is connected to a port of a chlorine source 2405, through which a chloride-containing solution or chlorine gas can be supplied during operation, for example. During operation, drinking water flows through the chemical germ barrier 200 along the direction of flow D and is exposed to chlorine in the process, so that germs are killed. In terms of its basic structure, the dosing pump 2400 could likewise be designed for ozone.

Figure 3:
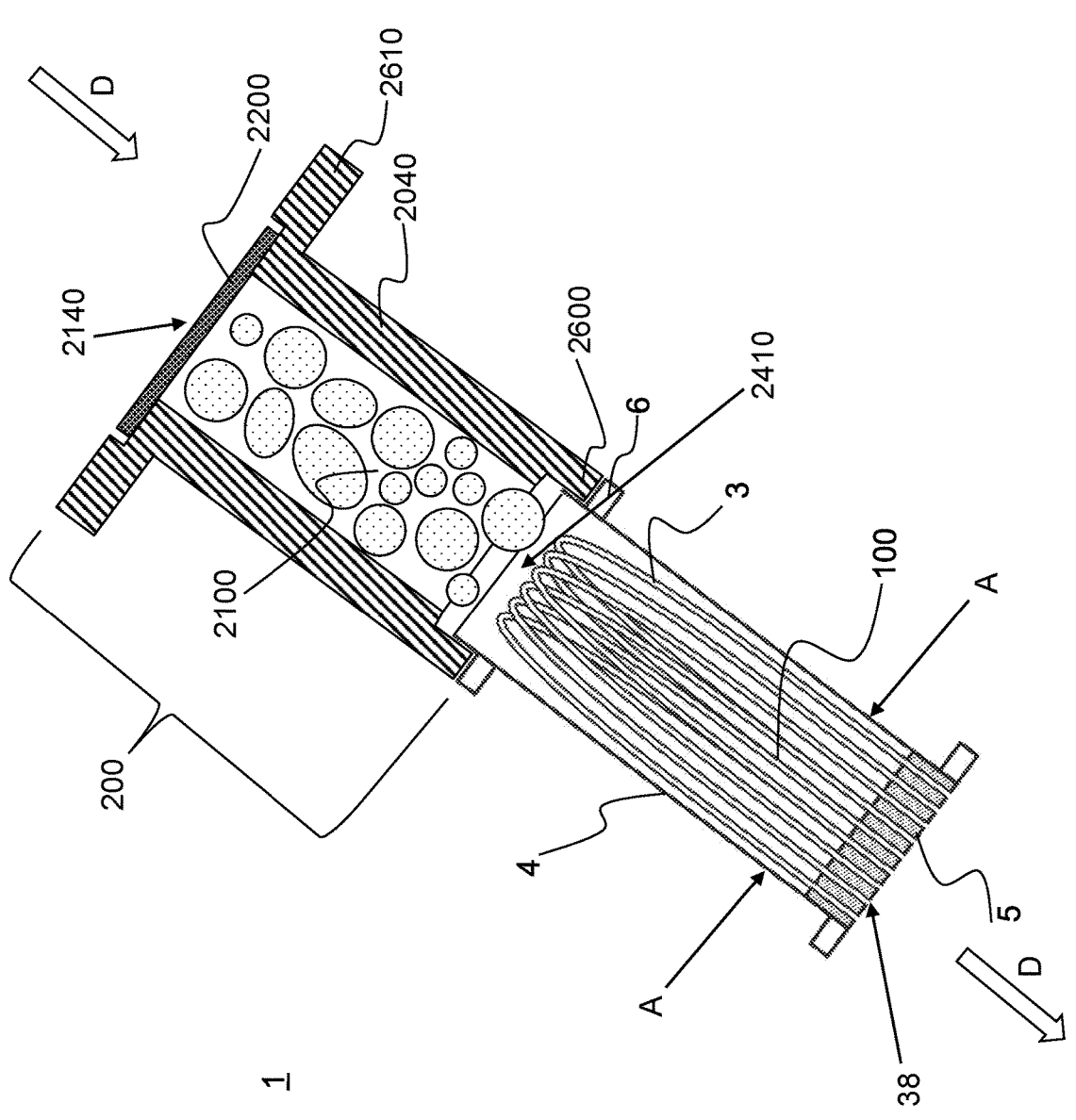
FIG. 3 is a schematic view of an embodiment of a drinking water filter.

FIG. 3 shows a longitudinal sectional view of an embodiment of a drinking water system 1 which, in addition to the chemical germ barrier 200, comprises a water treatment device 100 which is in the form of a membrane stack for ultrafiltration or microfiltration in the illustrated example. In this example, the chemical germ barrier comprises a material that has an alkalinizing and/or oxidative effect, and thus it is also referred to as an attachment.

The alkalinizing and/or oxidative material 2100 is provided in a sleeve 2040. The sleeve 2040 is preferably made of plastics material. Preferably, oxide granules, carbonate granules, peroxide granules, or a mixture of these materials are used as the alkalinizing and/or oxidative material. The material is provided in the form of a filling in the interior of sleeve 2040 of the attachment 200 and is denoted by reference numeral 2100 in the figures.

The attachment 200 has an inlet side 2140 and an outlet side 2410. During operation, input water enters the drinking water system 1 through the inlet side 2140 of the attachment 200 and leaves it via the extraction point 38 at the "point of use".

In the embodiment shown in FIG. 3, a water-permeable material is provided on the inlet side 2140 of the attachment 200, in order to prevent the alkalinizing and/or oxidative material 2100 from falling out when the drinking water system 1 is being handled. For this purpose, a retention grid or a fleece 2200 can be used.

However, depending on the field of use, it is also possible for the chemical germ barrier 200 to be filled with alkalinizing and/or oxidative material (and/or silver-containing particles) during assembly, and to then be installed without providing the inlet side 2140 with a retaining material.

This also applies to the embodiment of the chemical germ barrier as illustrated in FIGS. 2A and 2C. In order to be able to handle the chemical germ barrier 200 separately and independently of an optionally provided water treatment unit, the chemical germ barrier 200 has a retention grid or a fleece 2210 on the input side and on its output side 2410 in these variants. This also keeps the bed 2100 away from downstream components during operation.

In the illustrated embodiments, the chemical germ barrier 200 has fastening means 2600 on its input side 2140 and also fastening means 2600 on its output side 2410. These may be in the form of a flange or thread, for example. The fastening means 2610 on its inlet side 2140 allow the chemical germ barrier 200 to be connected to the outlet port of a source or a pipe for inlet water 300.

The fastening means 2600 on its output side 2410 allow the chemical germ barrier 200 to be connected to a downstream water treatment device. One of the latter is illustrated in FIG. 3 by way of the example of a microfilter or ultrafilter. A membrane stack for microfiltration or ultrafiltration is arranged in a sleeve 4 which is preferably made of plastics material. In the illustrated embodiment, the membranes of the membrane stack are in the form of capillary membranes. They are folded over inside the sleeve 4 and embedded in a potting compound 5 on the permeate side. The open ends of the capillary membranes 6 thus define the outlet from the drinking water system 1. In a further embodiment, the capillary membrane can also be operated in the opposite direction. In the operation of all embodiments, the outlet may constitute the immediate extraction point for drinking water.

The sleeve 4 has fastening means 6 which may come in the form of a bayonet lock or a thread, for example. This allows the sleeve 4 around the membrane stack to be connected to the chemical germ barrier 200, in interaction with the fastening means 2600 thereof.

Figure 4:
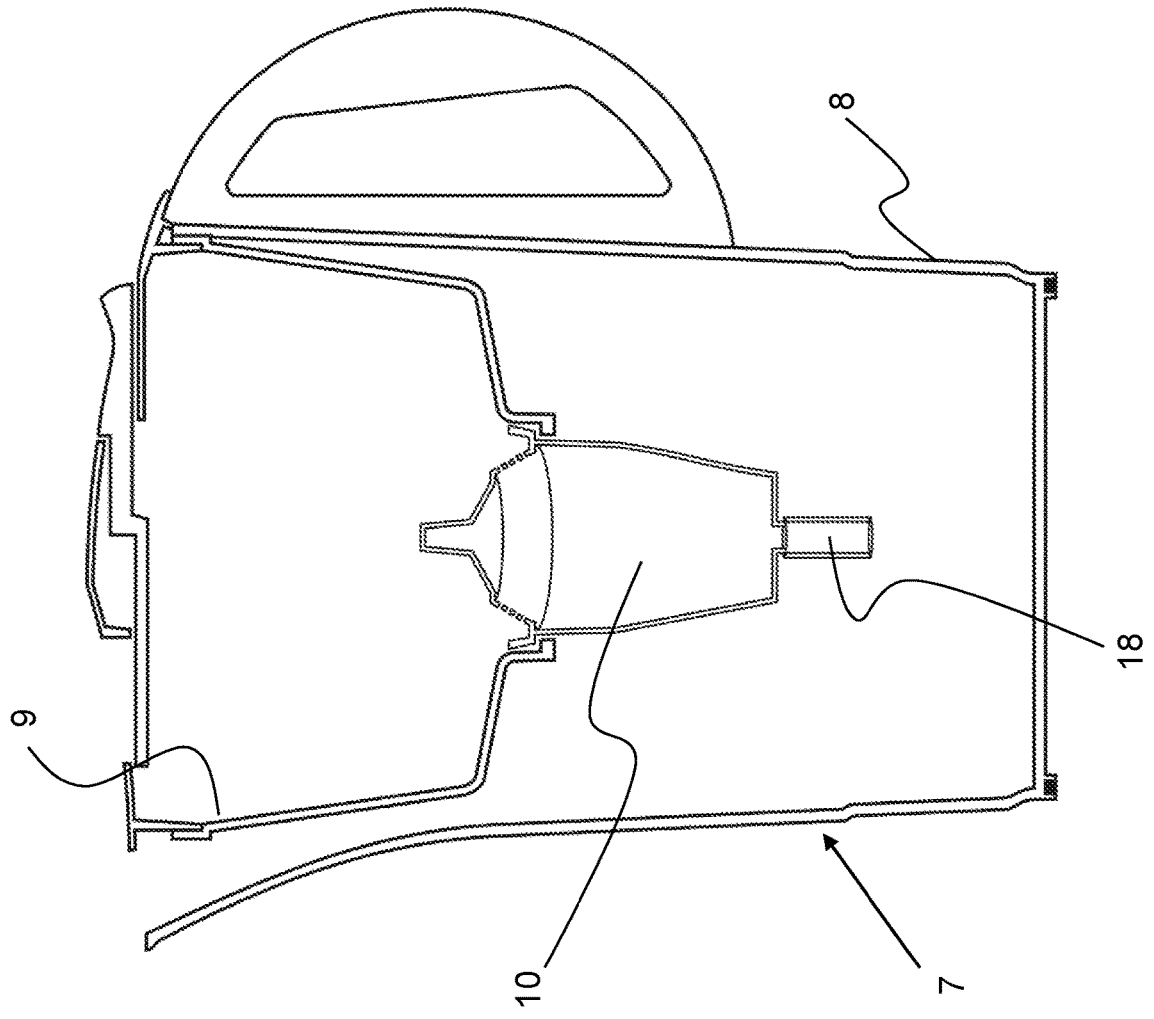
FIG. 4 is a schematic view of a gravity-driven domestic water filter.

FIG. 4 is a schematic view of a gravity-driven domestic water filter 7. The gravity-driven domestic water filter 7 comprises a jug for receiving the filtered water. Furthermore, the domestic water filter 7 comprises a funnel 9 into which the water to be treated is poured. This water passes through a filter cartridge 10 which is filled with an ion exchange material. After having passed through the filter cartridge 10, the water passes through a sleeve that includes a chemical germ barrier 200 and a microfilter or ultrafilter, for example as shown in FIG. 3. The entire sleeve is connected to the filter cartridge 10 in a detachable manner. The chemical germ barrier 200 prevents a biofilm from growing into the membrane stack and prevents a biofilm from growing into the filter bed of the filter cartridge 10.

Figure 5:
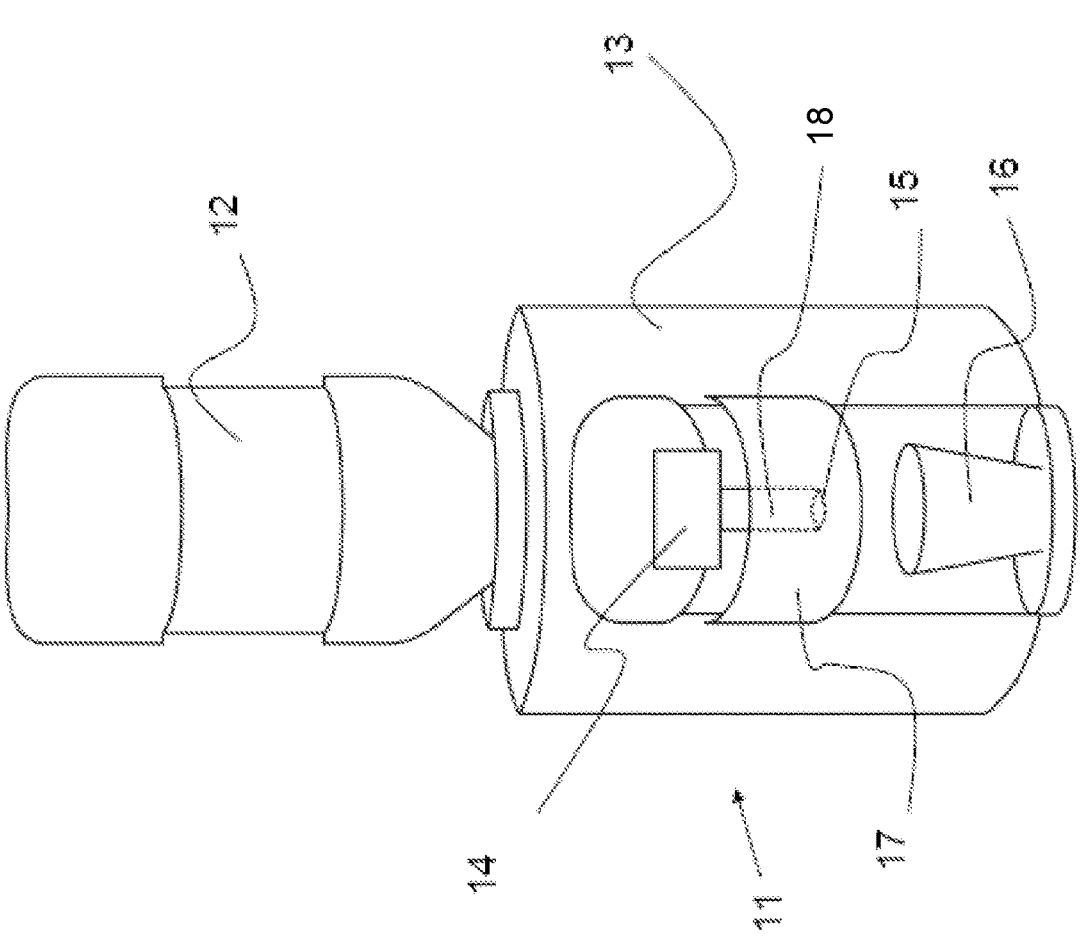
FIG. 5 is a schematic view of a water dispenser.

FIG. 5 is a schematic view of a water dispenser 11. The water dispenser 11 comprises a water container 12 which is installed in a housing 13. Provided on the housing is an actuating means 14 which the user can press. Water will then flow through the outlet 15 and into the user's cup 16 which can be placed on a support surface of the housing 13. The outlet 15 is in the form of a sleeve 18 comprising a chemical germ barrier and a microfilter or ultrafilter. The filtered water therefore emerges directly out of the filter. A contact protection 17 in the form of a peripheral wall is provided in front of the outlet 15, which prevents the user from unintentionally touching the outlet 15 and thereby contaminating it with bacteria.

Here, again, the germ barrier prevents a biofilm, which might arise from microorganisms retained by the membrane filter, from growing into the membrane filter or backwards into the water container 12.

Figure 6:
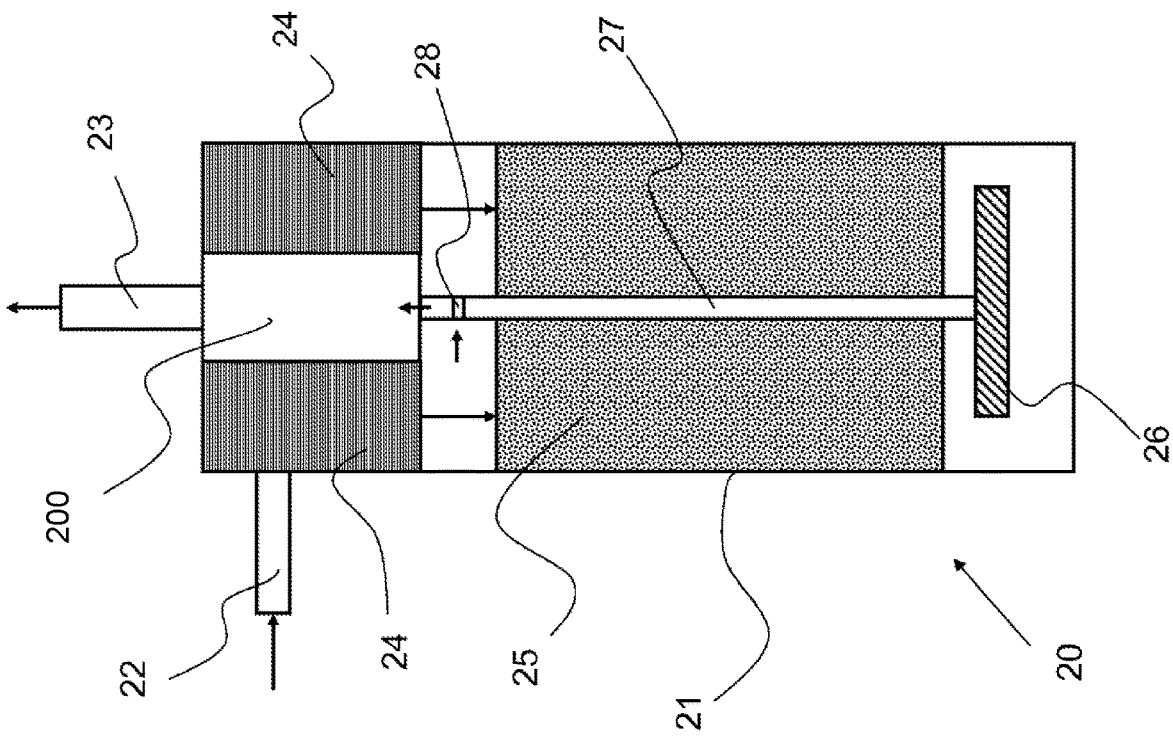
FIG. 6 is a schematic view of a filter cartridge.

FIG. 6 shows a filter cartridge 20 which comprises a chemical germ barrier 200. The filter cartridge 20 is in the form of a filter cartridge that can be connected into a supply line and has an inlet 22 and an outlet 23. The water to be treated flows into the housing 21 of the filter cartridge 20 via inlet 22 and leaves the housing 21 through the outlet 23. The path of the water is indicated by arrows. Such a filter cartridge 20 is also commonly referred to as a "filter candle".

After passing through the inlet 22, the water to be treated first passes through a layer of activated carbon 24. After leaving the layer of activated carbon 24, part of the water to be treated passes through a layer of an ion exchange material 25. The water then reverses the flow and passes through a filter 26 and into a riser tube 27 to be directed to the outlet 23. Above the ion exchange material 25, the riser tube 27 has a bypass 28 which may be in the form of an opening in the riser tube, for example. The bypass 28 ensures that part of the water to be treated does not pass through the ion exchange material 25, but reaches the outlet 23 without ion exchange taking place. In this way, the hardness of the water can be easily adjusted by mixing softened water with non-softened water. The chemical germ barrier 200 is arranged downstream of the riser tube 27 and upstream of the outlet 23. It has a slightly larger diameter than the riser tube 27.

Figure 7:
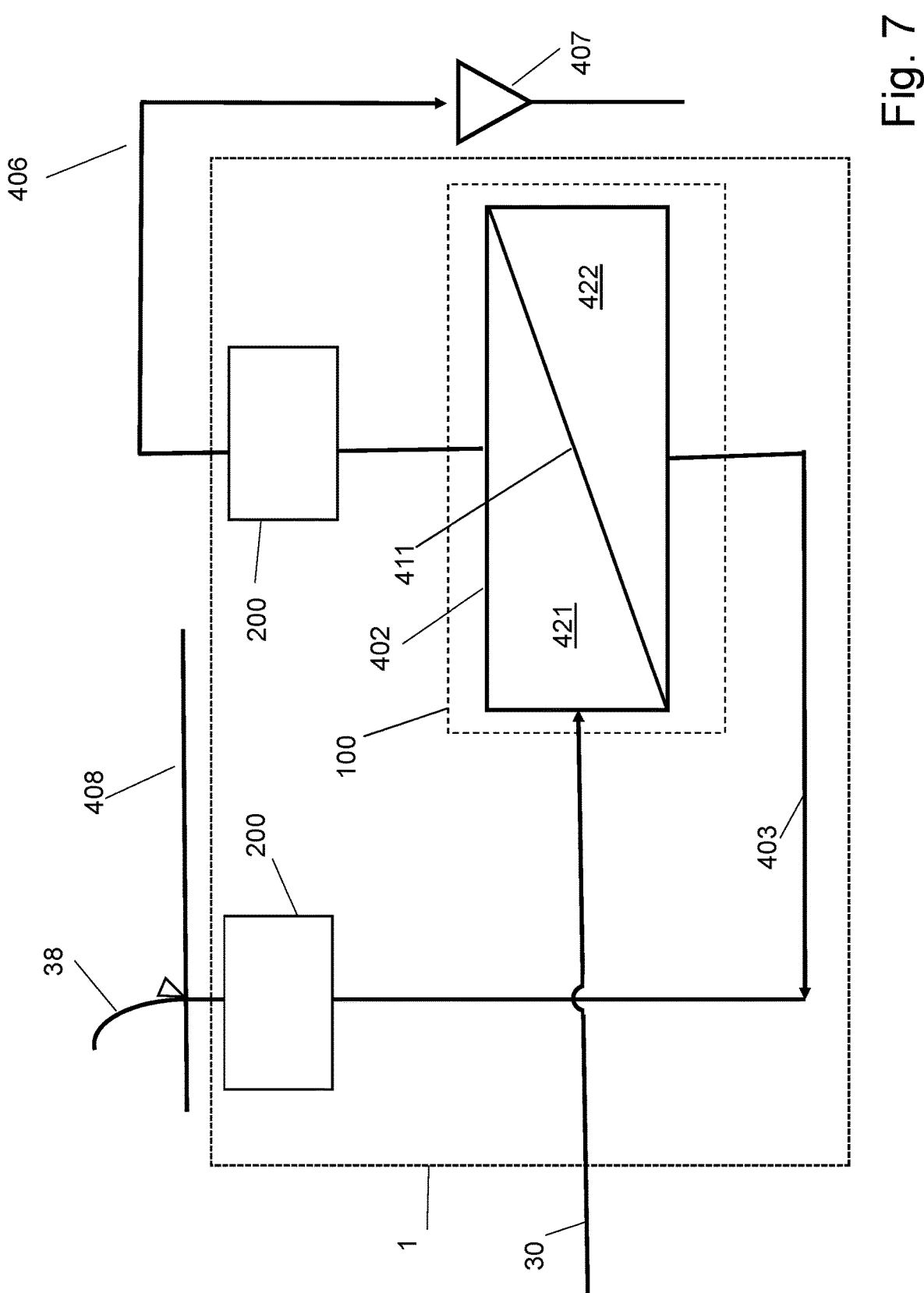
FIG. 7 is a schematic view of a drinking water system comprising a reverse osmosis tank.

FIG. 7 shows an embodiment with a drinking water system 1 which comprises two chemical germ barriers 200 and a water treatment system 100. A drinking water system 1 in the form of an under-sink system for drinking water in households is arranged below a kitchen worktop 408. This under-sink system includes a water treatment device 100 with a reverse osmosis tank 402. The water treatment device 100 is supplied with input water from a water source 30. During operation, treated water can be extracted from the water treatment device 100 through extraction line 403. The reverse osmosis tank 402 has a first chamber 421 and a second chamber 422. A semipermeable membrane 411 is arranged between the chambers 421, 422. During operation, the input water is passed through the semi-permeable membrane 411. Substances dissolved in the input water are held back in the first chamber 421 so that a concentrate is produced.

The concentrate can be discharged via the concentrate line 406 and discarded via a waste water line 407. Although a so-called "free outlet" is usually provided here, there is a risk of backward contamination with germs from the waste water line 407. To counteract such reverse contamination, a chemical germ barrier is arranged in the concentrate line 406.

During operation, water with a significantly reduced concentration of dissolved substances enters the second chamber 422. Via a line 403, this permeate is fed to the extraction point 38, here embodied as a faucet, as the treated water. To prevent backward contamination with germs here as well, a second chemical germ barrier is arranged in the extraction line 403.

Figure 8:
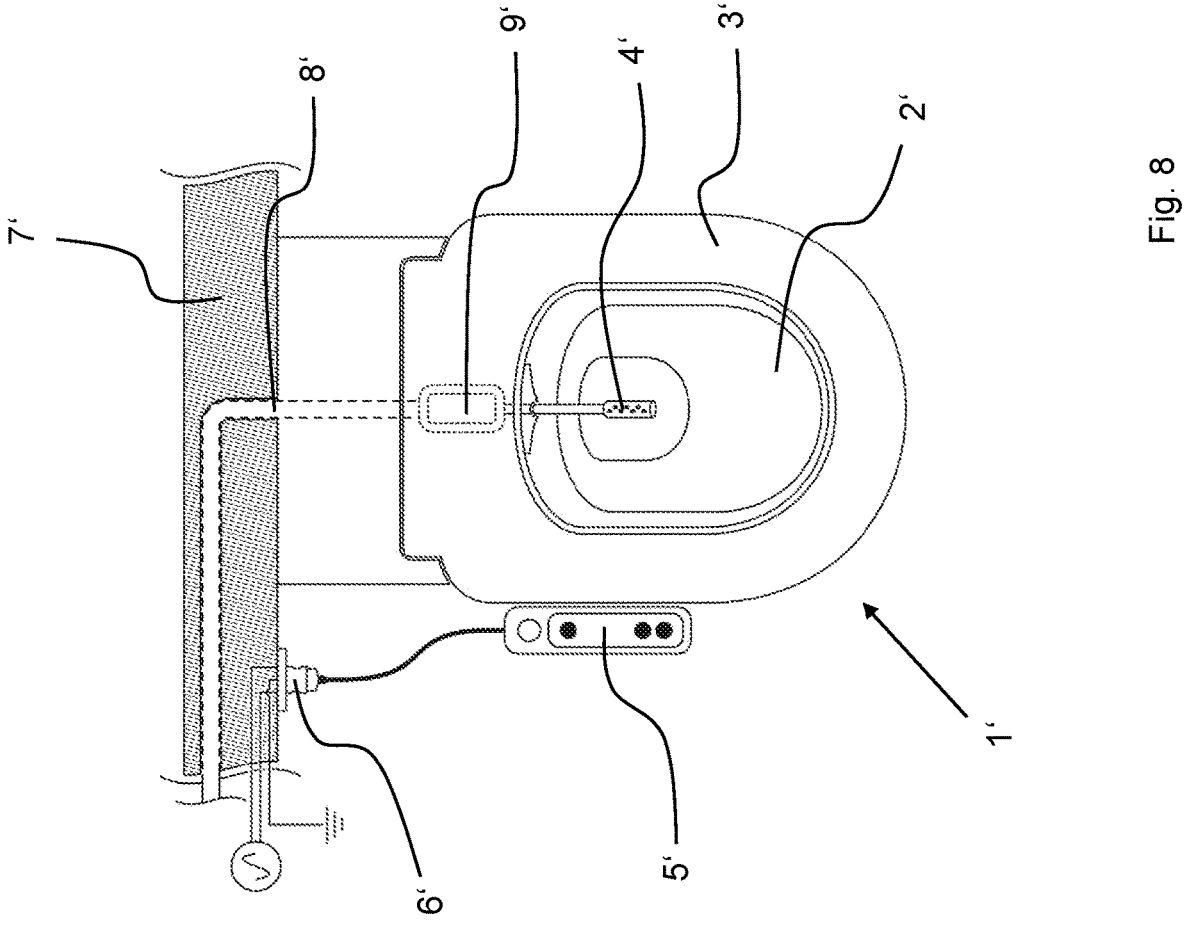
FIG. 8 is a schematic view of one embodiment of a shower toilet.

FIG. 8 shows a schematic view of an exemplary embodiment of a shower toilet 1', which comprises a germ barrier.

The shower toilet 1' comprises a toilet bowl 2' with a toilet seat 3' on which the user can sit down.

In this exemplary embodiment, the toilet bowl is in the form of a wall-mounted toilet bowl 2', which is mounted on an on-site existing wall 7', in particular on a mounting bracket (not shown).

The shower toilet 1' is connected to the on-site water pipe via a water connection 8'.

This exemplary embodiment illustrates a shower toilet 1' which comprises an extendable nozzle 4' that can be extended out of the toilet bowl 2'.

For controlling the nozzle 4' and the output of water therefrom, a control panel 5' is provided next to the toilet seat 3', which can be used to control various functions of the shower toilet 1', in particular the extension of the nozzle 4' in addition to the output of water.

Furthermore, the shower-toilet 1' may comprise a heater for heating the water that is discharged via the nozzle 4', a heater for the seat 3', and/or a warm-air fan for drying the cleaned buttocks of the user.

The control panel 5' is connected to an on-site electrical power outlet 6' via an electrical cable.

In this embodiment a removable cartridge 9' with an oxidizing and/or alkalinizing agent is arranged in a recess between the toilet seat 3' and the toilet bowl 2', which cartridge is effective as a germ barrier.

The cartridge 9' may in particular be filled with peroxide granules.

Figure 9:
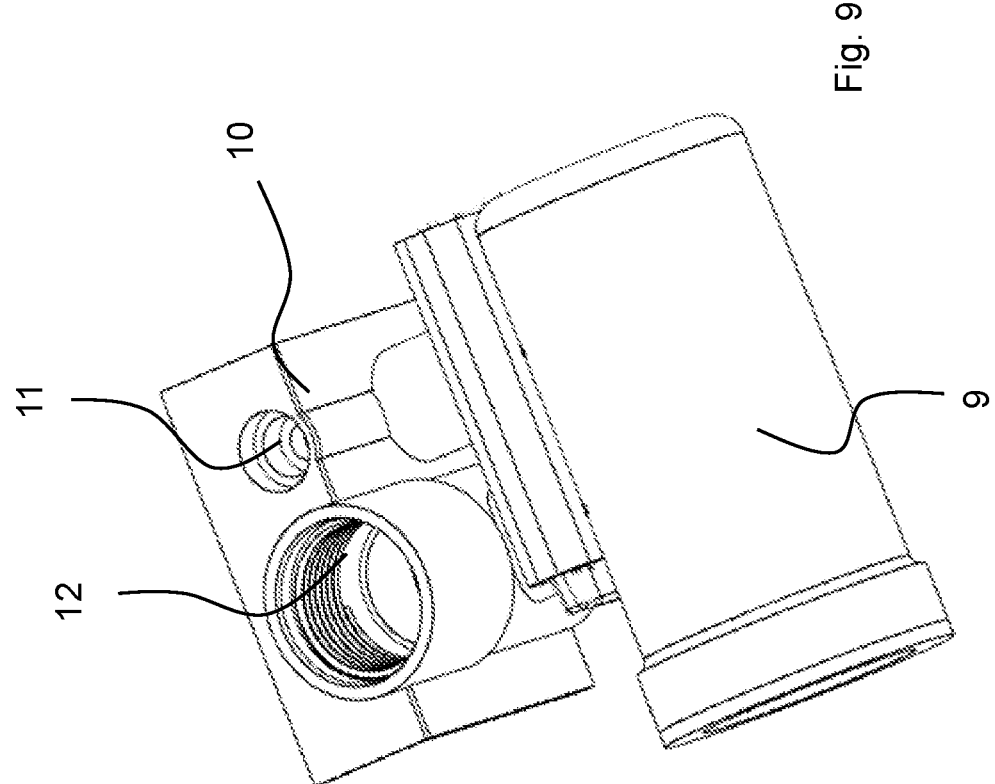
FIG. 9 shows a connecting piece together with a cartridge for the shower toilet.

An exemplary embodiment of such a cartridge is shown in FIG. 9 together with the connecting piece, or fitting.

FIG. 9 shows a connecting piece 10' which, depending on the embodiment, can be installed at different locations in the supply line for the nozzle 4', for example in the rear area between the toilet seat 3' and the toilet bowl 2'.

For this purpose, the connecting piece 10' has an inlet 11' and an outlet 12'.

Preferably, a self-closing valve (not shown) is provided between the inlet 11' and the cartridge 9', which closes when the cartridge 9' is removed.

Thus, it will not be necessary to shut off the water supply to the shower toilet when the cartridge 9' is replaced.

In particular when filled with peroxide granules, such a cartridge 9' will even be suitable for long-term use and provides a reliable germ barrier, which in particular allows to prevent the contamination of drinking water by reverse contamination with germs.

It will be apparent to a person skilled in the art that the invention is not limited to the examples described above, but may rather be varied in various ways. In particular it is possible for the features of the individually illustrated examples to be combined or interchanged with one another.

LIST OF REFERENCE NUMERALS

| | |
|---|---|
| 1 | Drinking water system |
| 3 | Capillary membrane |
| 4 | Membrane stack sleeve, sleeve |
| 5 | Potting compound |
| 6 | Fastening means |
| 1' | Shower toilet |
| 2' | Toilet bowl |
| 3' | Toilet seat |
| 4' | Nozzle |
| 5' | Control panel |
| 6' | Electrical power outlet |
| 7' | Wall |
| 8' | Water connection |
| 9' | Cartridge |
| 10' | Connecting piece |
| 11' | Inlet |
| 12' | Outlet |
| 200 | Chemical germ barrier, attachment, chlorine unit, ozone unit, silver unit |
| 2040 | Sleeve |
| 2140 | Inlet side of sleeve, inlet side of attachment |
| 2410 | Outlet side of sleeve, outlet side of attachment |
| 2100 | Alkalinizing and/or oxidative material |
| 2200 | Retention grid, fleece |
| 2210 | Retention grid, fleece |
| 2400 | Dosing pump for chlorine |
| 2405 | Chlorine source |
| 2500 | Silver-containing particles |
| 2600 | Fastening means, flange, thread |
| 2610 | Fastening means, flange, thread |
| 7 | Domestic water filter |
| 8 | Jug |
| 9 | Funnel |
| 10 | Filter cartridge |
| 11 | Water dispenser |
| 12 | Water container |
| 13 | Housing |
| 14 | Actuating means |
| 15 | Outlet |
| 16 | Cup |
| 17 | Contact protection |
| 18 | Sleeve |
| 20 | Filter cartridge |
| 21 | Housing of filter cartridge |
| 22 | Inlet of filter cartridge |
| 23 | Outlet of filter cartridge |
| 24 | Activated carbon |
| 25 | Ion exchange material |
| 26 | Filter |
| 27 | Riser tube |
| 28 | Bypass |
| 30 | Water source, water tank, water pipe |
| 35 | Pipe to extraction point, water pipe |
| 38 | Extraction point, "point of use" |
| 3000 | Input water |
| 3100 | Output water |

LIST OF REFERENCE NUMERALS

| | |
|---|---|
| 100 | Water treatment device, filter, microfilter/ultrafilter, membrane stack for microfiltration/ultrafiltration |
| 300 | Outlet from a source, pipe for inlet water |
| 401 | Inlet water pipe, non-treated water, water to be treated, feed |
| 402 | Reverse osmosis tank |
| 421 | First chamber of reverse osmosis tank |
| 422 | Second chamber of reverse osmosis tank |
| 403 | Permeate line, line for treated water |
| 406 | Concentrate line |
| 407 | Waste water |
| 408 | Kitchen worktop, table |
| 411 | Semipermeable membrane |
| D | Direction of flow |

What is claimed is:

1. A method for treating drinking water, comprising:
a stagnation phase in which the drinking water is not being extracted; and
an extraction phase in which the drinking water is extracted,
wherein the extraction phase includes
receiving water from a water source,
passing the water through a chemical germ barrier, and
delivering the water to an outlet, and
wherein the stagnation phase includes
exposing the water while stagnant within the chemical germ barrier to a material having an alkalinizing effect, and
enriching the water in the chemical germ barrier with OH-ions such that during the stagnation phase the drinking water assumes a pH in the range of 9 up to 13.

2. The method of claim 1,
wherein the material in the chemical germ barrier comprises a peroxide material generating hydrogen peroxide in the water while stagnant.

3. The method of claim 1,
wherein the pH is increased to a value of more than 10 and less than 13.

4. The method as in claim 1, wherein the chemical germ barrier is provided
within a housing having an internal volume between 15 ml and 50 ml.

5. The method of claim 2,
wherein during the stagnation phase the pH increases to a value of more than 10 and less than 13 and the hydrogen peroxide concentration increases to more than 1 mg/l and at most 50 mg/L after 5 hours.

* * * * *